United States Patent
Zhang et al.

(10) Patent No.: US 12,348,294 B2
(45) Date of Patent: Jul. 1, 2025

(54) SYSTEMS AND METHODS FOR CODEWORD REPORTING BY WIRELESS COMMUNICATION DEVICE FOR UPLINK TRANSMISSIONS

(71) Applicant: ZTE CORPORATION, Guangdong (CN)

(72) Inventors: Yang Zhang, Shenzhen (CN); Bo Gao, Shenzhen (CN); Ke Yao, Shenzhen (CN); Hao Wu, Shenzhen (CN); Zhaohua Lu, Shenzhen (CN); Yu Ngok Li, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 376 days.

(21) Appl. No.: 17/851,075

(22) Filed: Jun. 28, 2022

(65) Prior Publication Data

US 2022/0329309 A1 Oct. 13, 2022

Related U.S. Application Data

(63) Continuation of application No. PCT/CN2020/100874, filed on Jul. 8, 2020.

(51) Int. Cl.
*H04B 7/06* (2006.01)
*H04B 7/0426* (2017.01)
*H04B 7/0456* (2017.01)

(52) U.S. Cl.
CPC ........ *H04B 7/0639* (2013.01); *H04B 7/0426* (2013.01); *H04B 7/0456* (2013.01)

(58) Field of Classification Search
None
See application file for complete search history.

(56) References Cited

U.S. PATENT DOCUMENTS

2019/0081667 A1 3/2019 Yang et al.

FOREIGN PATENT DOCUMENTS

| | | |
|---|---|---|
| CN | 102165714 A | 8/2011 |
| CN | 102412939 A | 4/2012 |
| CN | 102468925 A | 5/2012 |
| CN | 107395259 A | 11/2017 |
| WO | WO-2017/050238 A1 | 3/2017 |
| WO | WO-2020/116998 A1 | 6/2020 |

OTHER PUBLICATIONS

CATT, "On UL full power transmission" 3GPP TSG RAN WG1 Meeting #101, R1-2003629, May 25, 2020, e-Meeting (12 pages).
(Continued)

*Primary Examiner* — Angela Nguyen
(74) *Attorney, Agent, or Firm* — Foley & Lardner LLP

(57) ABSTRACT

Systems and methods for wireless communications are disclosed herein. A first communication node reports at least one codeword, a number of antenna ports, a coherence capability of the antenna ports, or a full power transmission mode for the at least one uplink transmission to a second communication node. The at least one codeword is determined based on the number of antenna ports, the coherence capability, and the full power transmission mode. The at least one codeword includes at least one precoding matrix group or at least one Transmission Precoding Matrix Index (TPMI) group corresponding to the at least one precoding matrix group.

20 Claims, 9 Drawing Sheets

(56) References Cited

OTHER PUBLICATIONS

CATT, "Remaining issues on UL full power transmission" 3GPP TSG RAN WG1 Meeting #100bis, R1-2002092, Apr. 20, 2020, e-Meeting (6 pages).
CMCC, "Discussion on full TX Power UL transmission" 3GPP TSG RAN WG1 #101, R1-2003956, Jun. 5, 2020, e-Meeting (7 pages).
Ericsson, "Corrections for Full Power UL Transmission" 3GPP TSG-RAN WG1 Meeting #101, R1-2004346, May 25, 2020, e-Meeting (3 pages).
Ericsson, "UE features for eMIMO" 3GPP TSG-RAN WG1 Meeting #101, R1-2004351, May 25, 2020, e-Meeting (16 pages).
Extended European Search Report for EP Appl. No. 20944175.7, dated Nov. 16, 2022 (13 pages).
Huawei et al., "Remaining issues on UL full power transmission in R16" 3GPP TSG RAN WG1 Meeting #101-e, R1-2003533, May 25, 2020, e-Meeting (6 pages).
LG Electronics, "Text proposals on full Tx power UL transmission" 3GPP TSG RAN WG1 #101-e, R1-203932, Jun. 5, 2020, e-Meeting (7 pages).
Moderator (China Telecom), "Summary of uplink Tx switching" 3GPP TSG RAN WG1 #101, R1-2003830, May 25, 2020, e-Meeting (15 pages).
Moderator (China Telecom), "Summary#2 of uplink Tx switching" 3GPP TSG RAN WG1 #101, R1-2004699, May 25, 2020, e-Meeting (16 pages).
Moderator (VIVO), "Feature lead summary on ULFPTx" 3GPP TSG RAN WG1 #101, R1-2003402, May 25, 2020, e-Meeting (7 pages).
Nokia et al., "Remaining issues on Full Tx power UL transmission" 3GPP TSG-RAN WG1 Meeting #101, R1-2004267, May 25, 2020, e-Meeting (4 pages).
NTT Docomo Inc., "Remaining issues on full Tx power UL transmission" 3GPP TSG RAN WG1 #101, R1-2004397, May 25, 2020, e-Meeting (15 pages).
OPPO, "Discussion on Rel-16 eMIMO UE features" 3GPP TSG RAN WG1 #100bis, R1-2001738, Apr. 20, 2020, e-Meeting (7 pages).
OPPO, "Discussion on Rel-16 UE features" 3GPP TSG RAN WG1 #100, R1-2000488, Feb. 24, 2020, e-Meeting (6 pages).
OPPO, "Text proposals for full TX power UL transmission" 3GPP TSG RAN WG1 #101, R1-2004049, May 25, 2020, e-Meeting (6 pages).
Qualcomm Incorporated, "Discussion on 1Tx-2Tx switching impact in RAN1" 3GPP TSG RAN WG1 #101-e, R1-2004434, May 25, 2020, e-Meeting (8 pages).
Qualcomm Incorporated, "Discussion on eMIMO UE features" 3GPP TSG RAN WG1 #101, R1-2004481, May 25, 2020, e-Meeting (17 pages).
Qualcomm Incorporated, "Discussion on eMIMO UE features" 3GPP TSG RAN WG1 #101, R1-2004668, May 25, 2022, e-Meeting (17 pages).
VIVO, "Discussion on remaining issues on UL full power transmission" 3GPP TSG RAN WG1 #100b, R1-2001680, Apr. 20, 2020, e-Meeting (9 pages).
VIVO, "Discussion on remaining issues on ULFP and text proposals" 3GPP TSG RAN WG1 #100, R1-2000335, Feb. 24, 2020, e-Meeting (8 pages).
VIVO, "On remaining issues on UL full power Tx" 3GPP TSG RAN WG1 #101, R1-2003399, May 25, 2020, e-Meeting (3 pages).
VIVO, "Remaining issues on UL full power Tx" 3GPP TSG RAN WG1 #99, R1-1912041, Nov. 22, 2019, Reno, USA (4 pages).
Huawei et al.: "UL MIMO full power transmission with multiple PAs" 3GPP TSG RAN WG1 Meeting #97; R1-1906031; May 17, 2019; Reno, USA (11 pages).
International Search Report and Written Opinion for PCT Appl. No. PCT/CN2020/100874, dated Apr. 9, 2021 (9 pages).
First Office Action for CN Appl. No. 202080094297.6, dated Oct. 15, 2024 (with English translation, 15 pages).

FIG. 3A

| index | Precoding Matrices | TPMI(s) |
|---|---|---|
| G0 | $\frac{1}{2}\begin{bmatrix}1\\0\\0\\0\end{bmatrix}$ | 1 layer: TPMI=0 |
| G1 | $\{\frac{1}{2}\begin{bmatrix}1\\0\\0\\0\end{bmatrix}, \frac{1}{2}\begin{bmatrix}0\\0\\1\\0\end{bmatrix}\}, \frac{1}{2}\begin{bmatrix}1&0\\0&0\\0&1\\0&0\end{bmatrix}$ | 1 layer: TPMI=0, TPMI=2<br>2 layers: TPMI=1 |
| G2 | $\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\}, \{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\}, \frac{1}{2}\begin{bmatrix}1&0&0\\0&1&0\\0&0&1\\0&0&0\end{bmatrix}$ | 1 layer: TPMI=0, TPMI=1, TPMI=2<br>2 layers: TPMI=1, TPMI=0, TPMI=3<br>3 layers: TPMI=0 |
| G3 | $\frac{1}{2}\begin{bmatrix}1&0\\0&0\\0&1\\0&0\end{bmatrix}$ | 2 layers: TPMI=1 |
| G4 | $\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\}, \frac{1}{2}\begin{bmatrix}1&0&0\\0&1&0\\0&0&1\\0&0&0\end{bmatrix}$ | 2 layers: TPMI=1, TPMI=0, TPMI=3<br>3 layers: TPMI=0 |
| G5 | $\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\}, \frac{1}{2}\begin{bmatrix}1&0&0\\0&1&0\\0&0&1\\0&0&0\end{bmatrix}$ | 2 layers: TPMI=1, TPMI=4, TPMI=0, TPMI=2, TPMI=3, TPMI=5<br>3 layers: TPMI=0 |
| G6 | $\frac{1}{2}\begin{bmatrix}1\\0\\0\\0\end{bmatrix}, \frac{1}{2}\begin{bmatrix}1&0\\0&0\\0&1\\0&0\end{bmatrix}$ | 1 layer: TPMI=0<br>2 layers: TPMI=1 |
| G7 | $\frac{1}{2}\begin{bmatrix}1\\0\\0\\0\end{bmatrix}, \{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\}, \frac{1}{2}\begin{bmatrix}1&0&0\\0&1&0\\0&0&1\\0&0&0\end{bmatrix}$ | 1 layer: TPMI=0<br>2 layers: TPMI=1, TPMI=0, TPMI=3<br>3 layers: TPMI=0 |

FIG. 3B

| index | Precoding Matrices | TPMI(s) |
|---|---|---|
| G8 | $\{\frac{1}{2}\begin{bmatrix}1\\0\\0\\0\end{bmatrix}, \frac{1}{2}\begin{bmatrix}0\\0\\1\\0\end{bmatrix}\}, \{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}1&0\\1&0\\0&1\\0&0\end{bmatrix}, \frac{1}{2}\begin{bmatrix}0&0\\1&0\\0&1\\0&0\end{bmatrix}\}, \frac{1}{2}\begin{bmatrix}1&0&0\\0&1&0\\0&0&1\\0&0&0\end{bmatrix}$ | 1 layer: TPMI=0, TPMI=2<br><br>2 layers: TPMI=1, TPMI=0, TPMI=3<br><br>3 layers: TPMI=0 |
| G9 | $\frac{1}{2}\begin{bmatrix}1\\0\\0\\0\end{bmatrix}, \{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}1&0\\0&1\\0&1\\0&0\end{bmatrix}, \frac{1}{2}\begin{bmatrix}0&0\\1&0\\0&1\\0&1\end{bmatrix}\}, \frac{1}{2}\begin{bmatrix}1&0&0\\0&1&0\\0&0&1\\0&0&0\end{bmatrix}$ | 1 layer: TPMI=0<br><br>2 layers: TPMI=1, TPMI=4, TPMI=0, TPMI=2, TPMI=3, TPMI=5<br><br>3 layers: TPMI=0 |
| G10 | $\{\frac{1}{2}\begin{bmatrix}1\\0\\0\\0\end{bmatrix}, \frac{1}{2}\begin{bmatrix}0\\0\\1\\0\end{bmatrix}\}, \{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}1&0\\0&1\\0&1\\0&0\end{bmatrix}, \frac{1}{2}\begin{bmatrix}0&0\\1&0\\0&1\\0&1\end{bmatrix}\}, \frac{1}{2}\begin{bmatrix}1&0&0\\0&1&0\\0&0&1\\0&0&0\end{bmatrix}$ | 1 layer: TPMI=0, TPMI=2<br><br>2 layers: TPMI=1, TPMI=4, TPMI=0, TPMI=2, TPMI=3, TPMI=5<br><br>3 layers: TPMI=0 |
| G11 | $\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\}, \{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}1&0\\0&1\\0&1\\0&0\end{bmatrix}, \frac{1}{2}\begin{bmatrix}0&0\\1&0\\0&1\\0&1\end{bmatrix}\}, \frac{1}{2}\begin{bmatrix}1&0&0\\0&1&0\\0&0&1\\0&0&0\end{bmatrix}$ | 1 layer: TPMI=0, TPMI=1, TPMI=2<br><br>2 layers: TPMI=1, TPMI=4, TPMI=0, TPMI=2, TPMI=3, TPMI=5<br><br>3 layers: TPMI=0 |

FIG. 4A

| index | Precoding Matrices | TPMI(s) |
|---|---|---|
| G0 | $\left\{\frac{1}{2}\begin{bmatrix}1\\0\\0\\0\end{bmatrix}\right\}$ | 1 layer: TPMI=0 |
| G1 | $\left\{\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}1&0\\0&0\\0&1\\0&0\end{bmatrix}\right\}$ | 1 layer: TPMI=0, TPMI=2, TPMI=4, TPMI=5, TPMI=6, TPMI=7<br><br>2 layers: TPMI=1 |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \left\{\frac{1}{2}\begin{bmatrix}1&0&0\\0&1&0\\0&0&1\\0&0&0\end{bmatrix}\right\}$ | 1 layer: TPMI=0, TPMI=1, TPMI=2, TPMI=4, TPMI=5, TPMI=6, TPMI=7<br><br>2 layers: TPMI=1, TPMI=0, TPMI=3<br><br>3 layers: TPMI=0 |
| G3 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}1&0\\0&0\\0&1\\0&0\end{bmatrix}\right\}$ | 1 layer: TPMI=4, TPMI=5, TPMI=6, TPMI=7<br><br>2 layers: TPMI=1 |
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \left\{\frac{1}{2}\begin{bmatrix}1&0&0\\0&1&0\\0&0&1\\0&0&0\end{bmatrix}\right\}$ | 1 layer: TPMI=4, TPMI=5, TPMI=6, TPMI=7<br><br>2 layers: TPMI=1, TPMI=0, TPMI=3;<br><br>3 layers: TPMI=0; |
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$<br>$\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&1\\0&0\end{bmatrix}, \frac{1}{2}\begin{bmatrix}0&0\\1&0\\0&0\\0&1\end{bmatrix}, \frac{1}{2}\begin{bmatrix}1&0&0\\0&1&0\\0&0&1\\0&0&0\end{bmatrix}\right\},$ | 1 layer: TPMI=4, TPMI=5, TPMI=6, TPMI=7, TPMI=8, TPMI=9, TPMI=10, TPMI=11<br><br>2 layers: TPMI=1, TPMI=4, TPMI=0, TPMI=2, TPMI=3, TPMI=5;<br><br>3 layers: TPMI=0; |
| G6 | $\left\{\frac{1}{2}\begin{bmatrix}1\\0\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}1&0\\0&0\\0&1\\0&0\end{bmatrix}\right\}$ | 1 layer: TPMI=0, TPMI=4, TPMI=5, TPMI=6, TPMI=7<br><br>2 layers: TPMI=1 |

FIG. 4B

| index | Precoding Matrices | TPMI(s) |
|---|---|---|
| G7 | $\{\frac{1}{2}\begin{bmatrix}1\\0\\0\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\}, \{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\}, \frac{1}{2}\begin{bmatrix}100\\010\\001\\000\end{bmatrix}$ | 1 layer: TPMI=0, TPMI=4, TPMI=5, TPMI=6, TPMI=7<br><br>2 layers: TPMI=1, TPMI=0, TPMI=3;<br><br>3 layers: TPMI=0; |
| G8 | $\{\frac{1}{2}\begin{bmatrix}1\\0\\0\\0\end{bmatrix}, \frac{1}{2}\begin{bmatrix}0\\0\\1\\0\end{bmatrix}\}, \{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\}, \{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\}, \frac{1}{2}\begin{bmatrix}100\\010\\001\\000\end{bmatrix}$ | 1 layer: TPMI=0, TPMI=2, TPMI=4, TPMI=5, TPMI=6, TPMI=7<br><br>2 layers: TPMI=1, TPMI=0, TPMI=3;<br><br>3 layers: TPMI=0; |
| G9 | $\frac{1}{2}\begin{bmatrix}1\\0\\0\\0\end{bmatrix}, \{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\}, \{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\}$,<br>$\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\}, \frac{1}{2}\begin{bmatrix}100\\010\\001\\000\end{bmatrix}$ | 1 layer: TPMI=0, TPMI=4, TPMI=5, TPMI=6, TPMI=7, TPMI=8, TPMI=9, TPMI=10, TPMI=11<br><br>2 layers: TPMI=1, TPMI=4, TPMI=0, TPMI=2, TPMI=3, TPMI=5;<br><br>3 layers: TPMI=0; |
| G10 | $\{\frac{1}{2}\begin{bmatrix}1\\0\\0\\0\end{bmatrix}, \frac{1}{2}\begin{bmatrix}0\\0\\1\\0\end{bmatrix}\}, \{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\}, \{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\}$,<br>$\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\}, \frac{1}{2}\begin{bmatrix}100\\010\\001\\000\end{bmatrix}$ | 1 layer: TPMI=0, TPMI=2, TPMI=4, TPMI=5, TPMI=6, TPMI=7, TPMI=8, TPMI=9, TPMI=10, TPMI=11<br><br>2 layers: TPMI=1, TPMI=4, TPMI=0, TPMI=2, TPMI=3, TPMI=5;<br><br>3 layers: TPMI=0; |
| G11 | $\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\}, \{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\}, \{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\}$,<br>$\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\}, \frac{1}{2}\begin{bmatrix}100\\010\\001\\000\end{bmatrix}$ | 1 layer: TPMI=0, TPMI=1, TPMI=2, TPMI=4, TPMI=5, TPMI=6, TPMI=7, TPMI=8, TPMI=9, TPMI=10, TPMI=11<br><br>2 layers: TPMI=1, TPMI=4, TPMI=0, TPMI=2, TPMI=3, TPMI=5;<br><br>3 layers: TPMI=0; |

FIG. 6

| TPMI index | $W$ (TPMI index increases from left to right) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | - | - | - | - |

FIG. 7

| TPMI index | $W$ (TPMI index increases from left to right) | | | |
|---|---|---|---|---|
| 0 – 3 | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 1\\0 & 0\end{bmatrix}$ | $\frac{1}{2}\begin{bmatrix}1 & 0\\0 & 0\\0 & 0\\0 & 1\end{bmatrix}$ | $\frac{1}{2}\begin{bmatrix}0 & 0\\1 & 0\\0 & 1\\0 & 0\end{bmatrix}$ |
| 4 – 7 | $\frac{1}{2}\begin{bmatrix}0 & 0\\1 & 0\\0 & 0\\0 & 1\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0\\0 & 1\\1 & 0\\0 & j\end{bmatrix}$ |
| 8 – 11 | $\frac{1}{2}\begin{bmatrix}1 & 0\\0 & 1\\-j & 0\\0 & 1\end{bmatrix}$ | $\frac{1}{2}\begin{bmatrix}1 & 0\\0 & 1\\-j & 0\\0 & -1\end{bmatrix}$ | $\frac{1}{2}\begin{bmatrix}1 & 0\\0 & 1\\-1 & 0\\0 & -j\end{bmatrix}$ | $\frac{1}{2}\begin{bmatrix}1 & 0\\0 & 1\\-1 & 0\\0 & j\end{bmatrix}$ |
| 12 – 15 | $\frac{1}{2}\begin{bmatrix}1 & 0\\0 & 1\\j & 0\\0 & 1\end{bmatrix}$ | $\frac{1}{2}\begin{bmatrix}1 & 0\\0 & 1\\j & 0\\0 & -1\end{bmatrix}$ | $\frac{1}{2\sqrt{2}}\begin{bmatrix}1 & 1\\1 & 1\\1 & -1\\1 & -1\end{bmatrix}$ | $\frac{1}{2\sqrt{2}}\begin{bmatrix}1 & 1\\1 & 1\\j & -j\\j & -j\end{bmatrix}$ |
| 16 – 19 | $\frac{1}{2\sqrt{2}}\begin{bmatrix}1 & 1\\j & j\\1 & -1\\j & -j\end{bmatrix}$ | $\frac{1}{2\sqrt{2}}\begin{bmatrix}1 & 1\\j & j\\j & -j\\-1 & 1\end{bmatrix}$ | $\frac{1}{2\sqrt{2}}\begin{bmatrix}1 & 1\\-1 & -1\\1 & -1\\-1 & 1\end{bmatrix}$ | $\frac{1}{2\sqrt{2}}\begin{bmatrix}1 & 1\\-1 & -1\\j & -j\\-j & j\end{bmatrix}$ |
| 20 – 21 | $\frac{1}{2\sqrt{2}}\begin{bmatrix}1 & 1\\-j & -j\\1 & -1\\-j & j\end{bmatrix}$ | $\frac{1}{2\sqrt{2}}\begin{bmatrix}1 & 1\\-j & -j\\j & -j\\1 & -1\end{bmatrix}$ | - | - |

FIG. 8

| TPMI index | $W$ (TPMI index increase from left to right) | | | |
|---|---|---|---|---|
| 0 – 3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 – 6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | - |

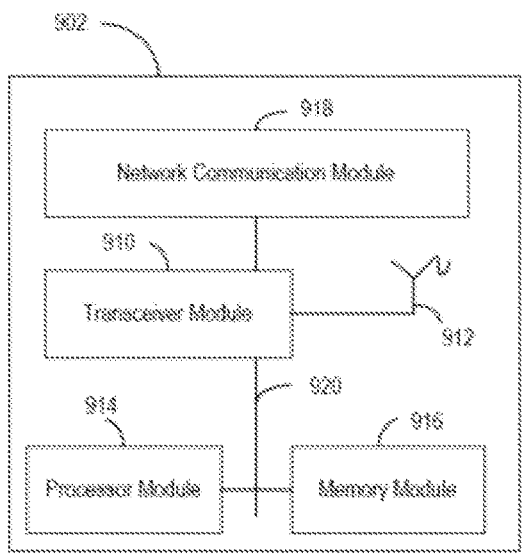

FIG. 9A

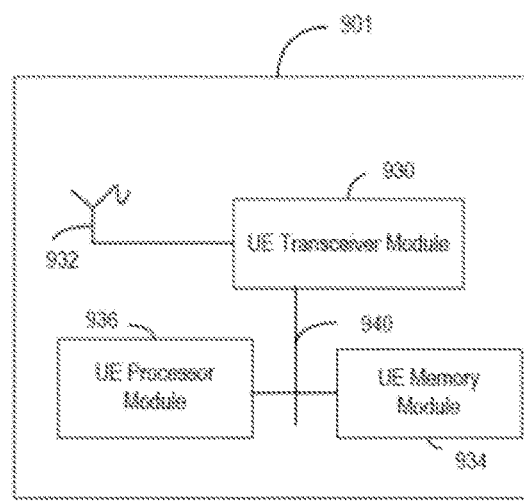

FIG. 9B

SYSTEMS AND METHODS FOR CODEWORD REPORTING BY WIRELESS COMMUNICATION DEVICE FOR UPLINK TRANSMISSIONS

CROSS-REFERENCE TO RELATED APPLICATION

This application claims the benefit of priority under 35 U.S.C. § 120 as a continuation of PCT Patent Application No. PCT/CN2020/100874, filed on Jul. 8, 2020, the disclosure of which is incorporated herein by reference in its entirety.

TECHNICAL FIELD

The present disclosure relates to the field of telecommunications, and in particular, to codeword reporting by the wireless communication device for uplink transmissions.

BACKGROUND

Demands for the 5th Generation Mobile Communication Technology (5G) are increasing at a rapid pace. Developments are taking place to provide enhanced mobile broadband, ultra-high reliability, ultra-low-latency transmission, and massive connectivity in 5G systems.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a first communication node reports at least one codeword to a second communication node. The first communication node receives, from the second communication node, at least one indicated codeword capable of being used for at least one subsequent uplink transmission. The first communication node then performs the at least one subsequent uplink transmission.

In some embodiments, a second communication node receives at least one codeword from a first communication node. The second communication node transmits, to the first communication node, at least one indicated codeword capable of being used for at least one subsequent uplink transmission. The second communication node then receives, from the first communication node, the at least one subsequent uplink transmission.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 3A is a first part of table showing full power TPMI groups for 4-ports, non-coherent UE in Mode 2, in accordance with some embodiments of the present disclosure.

FIG. 3B is a second part of table showing full power TPMI groups for 4-ports, non-coherent UE in Mode 2, in accordance with some embodiments of the present disclosure.

FIG. 4A is a first part of table showing full power TPMI groups for 4-ports, partial-coherent UE in Mode 2, in accordance with some embodiments of the present disclosure.

FIG. 4B is a second part of table showing full power TPMI groups for 4-ports, partial-coherent UE in Mode 2, in accordance with some embodiments of the present disclosure.

FIG. 6 is a table showing precoding matrices W for one-layer transmissions using four antenna ports with transform precoding disabled, in accordance with some embodiments.

FIG. 7 is a table showing precoding matrices W for two-later transmissions using four antenna ports with transform precoding disabled, in accordance with some embodiments.

FIG. 8 is a table showing precoding matrices W for three-layer transmissions using four antenna ports with transform precoding disabled, in accordance with some embodiments.

FIG. 9A illustrates a block diagram of an example base station, in accordance with some embodiments of the present disclosure; and FIG. 9B illustrates a block diagram of an example UE, in accordance with some embodiments of the present disclosure.

DETAILED DESCRIPTION OF EXAMPLE EMBODIMENTS

Figure 1:
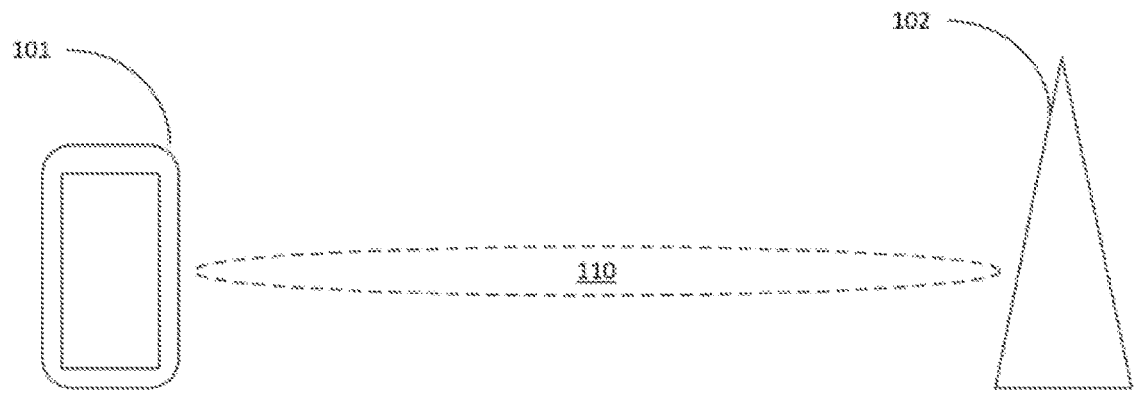
FIG. 1 is a schematic diagram of a UE and a base station, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of blocks in the methods disclosed herein are merely example approaches. Based upon design preferences, the specific order or hierarchy of blocks of the disclosed methods or processes can be re-arranged while remaining within the scope of the present solution. Thus, those of ordinary skill in the art will understand that the methods and techniques disclosed herein present various blocks or acts in a sample order, and the present solution is not limited to the specific order or hierarchy presented unless expressly stated otherwise.

Developments in 5G wireless communication systems are directed to achieving higher data communication rate (e.g., in Gbps), massive number of communication links (e.g., 1 M/Km$^2$), ultra-low latency (e.g., under 1 ms), higher reliability, and improved energy efficiency (e.g., at least 100 times more efficient than previous systems). To achieve such improvements, in wireless communication systems under the 5G standard, two uplink transmission modes have been developed in order to enable a User Equipment (UE) to transmit Uplink (UL) signals (e.g., PUSCH, PUCCH, SRS, and PRACH) with full-power under the maximum output power threshold. Although the existing 5G New Radio (NR) technologies allow the UE to support non-codebook based transmission utilizing full transmission power, there is not a complete scheme for supporting the terminal to utilize the full transmission power when performing codebook-based transmission.

To address this issue, two responding UL transmission modes have been reached to match this functionality. These two UL transmission modes are referred to as Mode 1 and Mode 2. Mode 1 corresponds to the expend Transmitted Precoded Matrix Indicators (TPMIs) for the low coherent capability of the UE's antenna ports, while Mode 2 corresponds to the enhanced capabilities of antenna port virtualization and full power TPMIs, reported by the UE. For Mode 2, methods of port virtualization and TPMI group reporting are used to support full power transmission of the UE. The intention of TPMI group reporting is to support more usage of different Power Amplifier (PA) architectures as much as possible to implement full power transmission with limited signaling overhead. As such, the present disclosure is directed to systems and methods for designing the TPMI groups to optimize the functionality of TPMI group reporting in Mode 2.

Coherence capability of antenna ports refers to whether a relative phase between ports is able to be adjusted. In the case of full coherence, the UE is capable of controlling the relative phase between all of the antenna ports that are to be used for transmission. In the case of partial coherence, the UE is capable of controlling the relative phase within pairs of ports (e.g., pairwise coherence). However, there is no guarantee of a controllable phase (e.g., coherence) between any pair of the device antenna ports. In the case of no coherence, there is no guarantee of coherence between any pair of the device antenna ports.

As used herein, the term 'codeword' refers to a precoding matrix or a Transmission Precoding Matrix Index (TPMI) of codebook-based transmission for multi-ports of a transmission terminal. Each row of the precoding matrix represents an antenna port and each column of the precoding matrix represents a layer. Further, 'a first communication node' can be referred to as a terminal and can include, or be implemented as, a UE, a user terminal, a mobile station (MS) a station (STA), etc.), while a 'second communication node' can be referred to as a network side and can include, or be implemented as, a base station, a next Generation Node B (gNB), an E-UTRAN Node B (eNB), a core network, a Transmission/Reception Point (TRP), an Access Point (AP), etc.

Generally, a base station may determine a number of antenna ports based on a capability of transmission antennas of the first communication node (e.g., a UE) and may configure the UE to transmit Sounding Reference Signal(s) (SRS(s)). The SRS is utilized to measure UL channels, which is also called channel sounding. After acquiring results of the channel sounding, the base station accordingly determines multiple-input-multiple-output (MIMO) parameters (e.g., the number of layers, precoding, etc.) for subsequent UL transmission(s) and instructs the number of layers and corresponding precoding matrices (e.g., TPMI) to the UE. The UE then uses the precoding matrix instructed by the base station to perform precoding on data and transmits the data to the base station.

In the NR system, the UL transmissions adopting the MIMO may be classified into codebook based transmissions and non-codebook based transmissions. Note that, a codebook is an information set of a group of predefined codeword(s) and corresponding layers and includes at least one codeword.

As to the codebook based transmissions, the base station selects appropriate precoding information (e.g. codeword) among predefined codebook based on measured channel(s) and indicates the selected precoding information to the UE via indicating TPMI corresponding to the selected precoding information.

FIG. 1 shows an example UE 101 performing UL transmission, which is illustrated by a network link or connection 110, with a base station 102. In some examples, the network link or connection 110 can be used for uplink and downlink communications between the UE 101 and the base station 102. The UE 101, in this example, is the first communication node. In other examples, the UE 101 may be a wireless communication device, user terminal, MS, STA, or any other terminal. The base station 102, in this example, is the second communication node. In other examples, the base station 102 may be a gNB, an eNB, a core network, a TRP, an AP, or any other network side component.

Figure 2A:
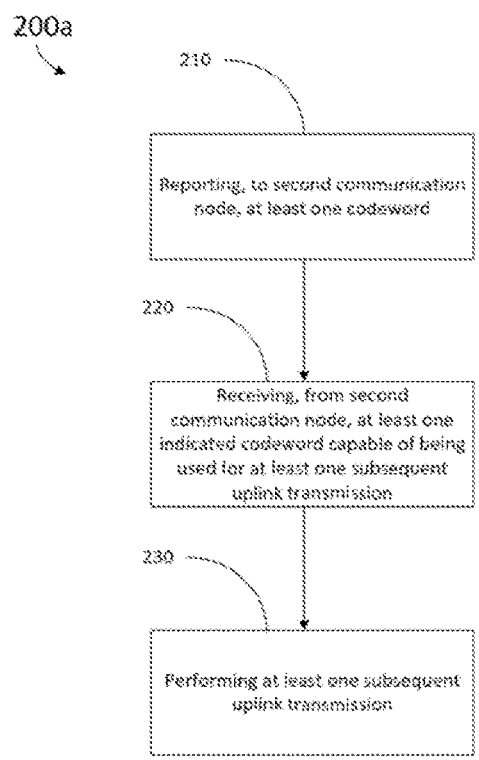
FIG. 2A is a schematic diagram illustrating a method for wireless communication, in accordance with some embodiments.

FIG. 2A is a schematic diagram illustrating a method 200a for wireless communication, in accordance with some embodiments. The method 200a is performed by the first communication node or terminal, which can include or be implemented as a UE, a user terminal, a MS, a STA, etc., which corresponds to UE 101 from FIG. 1. At 210, the first communication node reports, to the second communication node or network, at least one codeword according to the transmission mode of the first communication node. At 220, the first communication node receives, from the second communication node, at least one indicated codeword capable of being used for at least one subsequent UL transmission. Then, at 230, the first communication node performs the at least one subsequent UL transmission.

In one embodiment, the transmission mode of the first communication node is at least one of a first transmission mode (e.g., Mode 1 or fullpowerMode 1), a second transmission mode (e.g., Mode 2 or fullpowerMode 2), a full power transmission mode (e.g., Mode 0 or fullpower), or a transmission mode supporting indicating whether the indicated codeword corresponds to a full power state.

In one embodiment, the at least one codeword may be reported, according to the transmission mode, in a form of at least one precoding matrix group corresponding to the at least one TPMI group. As such, the first communication node may report at least one corresponding TPMI group to the second communication node in order to assist the second communication node to configure or indicate the codeword that may be utilized for subsequent codebook based UL transmission(s).

The first communication node reports to the second communication node, a number of antenna ports, a coherence capability of the antenna ports, and a full power transmission mode for the uplink transmission. In some embodiments, the first communication node utilizes this information in order to determine the at least one codeword, which may be a precoding matrix group or a TPMI group, to report. In some of these embodiments, an indication information field of the at least one codeword reported by the first communication node is a codepoint or a bitmap.

In an example embodiment, when the reported number of antenna ports for UL transmission of the first communication node is 4, the reported coherence capability of the antenna ports is non-coherent, and the full power transmission mode includes Mode 2, the at least one codeword reported by the first communication node is one of the precoding matrix groups and/or TPMI groups G0-G11, as shown in FIGS. 3A and 3B. FIG. 3A is a first part of a table showing full power TPMI groups for 4-ports, non-coherent UE in Mode 2, in accordance with some embodiments of the present disclosure. FIG. 3B is a second part of a table showing full power TPMI groups for 4-ports, non-coherent UE in Mode 2, in accordance with some embodiments of the present disclosure.

In an example embodiment, when the number of antenna ports reported for uplink transmission of the first communication node is 4, the reported coherence capability of the antenna ports is non-coherent, and the full power transmission mode includes Mode 2, the at least one codeword reported by the first communication node may include at least one of the precoding matrix groups and/or TPMI groups G0-G5, as shown in FIG. 3A.

In an example embodiment, when the number of antenna ports reported for UL transmission of the first communication node is 4, the reported coherence capability of the antenna ports is partial-coherent, and the full power transmission mode includes Mode 2, the at least one codeword reported by the first communication node is one of the precoding matrix groups and/or TPMI groups G0-G11, as shown in FIGS. 4A and 4B. FIG. 4A is a first part of a table showing full power TPMI groups for 4-ports, partial-coherent UE in Mode 2, in accordance with some embodiments of the present disclosure. FIG. 4B is a second part of a table showing full power TPMI groups for 4-ports, partial-coherent UE in Mode 2, in accordance with some embodiments of the present disclosure.

In another embodiment, when the number of antenna ports reported for UL transmission of the first communication node is 4, the reported coherence capability of the antenna ports is partial-coherent, and the full power transmission mode includes Mode 2, the at least one codeword reported by the first communication node may include at least one of the precoding matrix groups and/or TPMI groups G0-G5 as shown in FIG. 4A.

In an embodiment, the precoding matrix/TPMI group G0 shown in FIG. 3A or FIG. 4A is used for supporting a UE with 4 antenna ports whose PAs are equal to or greater than [23 17 17 17] dBm to perform the UL full power transmission. In another embodiment, the precoding matrix/TPMI group G1 shown in FIG. 3A or FIG. 4A is used for supporting a UE with 4 antenna ports whose PAs are equal to or greater than [23 17 23 17] dBm to perform the UL full power transmission. In another embodiment, the precoding matrix/TPMI group G2 shown in FIG. 3A or FIG. 4A is used for supporting a UE with 4 antenna ports whose PAs are equal to or greater than [23 23 23 17] dBm to perform the UL full power transmission. In another embodiment, the precoding matrix/TPMI group G3 shown in FIG. 3A or FIG. 4A is used for supporting a UE with 4 antenna ports whose PAs are equal to or greater than [20 17 20 17] dBm to perform the UL full power transmission. In another embodiment, the precoding matrix/TPMI group G4 shown in FIG. 3A or FIG. 4A is used for supporting a UE with 4 antenna ports whose PAs are equal to or greater than [20 20 20 17] dBm to perform the UL full power transmission. In another embodiment, the precoding matrix/TPMI group G5 shown in FIG. 3A or FIG. 4A is used for supporting a UE with 4 antenna ports whose PAs are equal to or greater than [20 20 20 20] dBm to perform the UL full power transmission. In another embodiment, the precoding matrix/TPMI group G6 shown in FIG. 3A or FIG. 4A is used for supporting a UE with 4 antenna ports whose PAs are equal to or greater than [23 17 20 17] dBm to perform the UL full power transmission. In another embodiment, the precoding matrix/TPMI group G7 shown in FIG. 3A or FIG. 4B is used for supporting a UE with 4 antenna ports whose PAs are equal to or greater than [23 20 20 17] dBm to perform the UL full power transmission. In another embodiment, the precoding matrix/TPMI group G8 shown in FIG. 3B or FIG. 4B is used for supporting a UE with 4 antenna ports whose PAs are equal to or greater than [23 20 23 17] dBm to perform the UL full power transmission. In another embodiment, the precoding matrix/TPMI group G9 shown in FIG. 3B or FIG. 4B is used for supporting a UE with 4 antenna ports whose PAs are equal to or greater than [23 20 20 20] dBm to perform the UL full power transmission. In another embodiment, the precoding matrix/TPMI group G10 shown in FIG. 3B or FIG. 4B is used for supporting a UE with 4 antenna ports whose PAs are equal to or greater than [23 20 23 20] dBm to perform the UL full power transmission. In another embodiment, the precoding matrix/TPMI group G11 shown in FIG. 3B or FIG. 4B is used for supporting a UE with 4 antenna ports whose PAs are equal to or greater than [23 23 23 20] dBm to perform the UL full power transmission.

In an embodiment, an indication information field of the reported at least one codeword reported by the first communication node can be a codepoint or a bitmap.

Referring to block 220 of FIG. 2A, in some embodiments, the indicated codeword also refers to a configured codeword. The configured or indicated codeword can be configured or indicated by the second communication node. In an embodiment, when the transmission mode configured or indicated by the second transmission node is Mode 2 or fullpower-Mode 2, and the configured or indicated codeword belongs to the codeword(s) reported by the first communication node in block 210, the power scale for the configured or indicated codeword is 1.

Referring to block 230 of FIG. 2A, in an embodiment, the terminal transmits the subsequent UL transmission(s) based on the configured or indicated codeword. In some embodiments, the configured or indicated codeword is one of the codeword(s) reported by the first communication node. In other embodiments, the configured or indicated codeword is different from the codeword(s) reported by the first communication node.

Figure 2B:
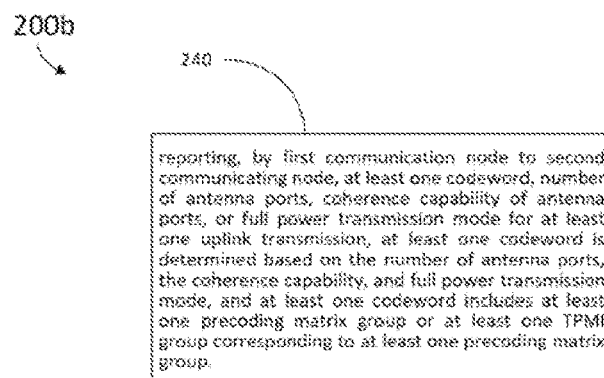
FIG. 2B is a schematic diagram illustrating a method for wireless communication, in accordance with some embodiments.

FIG. 2B is a schematic diagram illustrating a method 200b for wireless communication, in accordance with some embodiments. The method 200b is performed by the first communication node or terminal, which can include or be implemented as a UE, a user terminal, a MS, a STA, etc., which corresponds to UE 101 from FIG. 1. At 240, the first communication nodes reports to the second communication node, at least one codeword, a number of antenna ports, a coherence capability of the antenna ports, or a full power transmission mode for the at least one uplink transmission. The at least one codeword is determined based on the number of antenna ports, the coherence capability, and the full power transmission mode. The at least one codeword includes at least one precoding matrix group or at least one TPMI group corresponding to the at least one precoding matrix group.

Figure 5A:
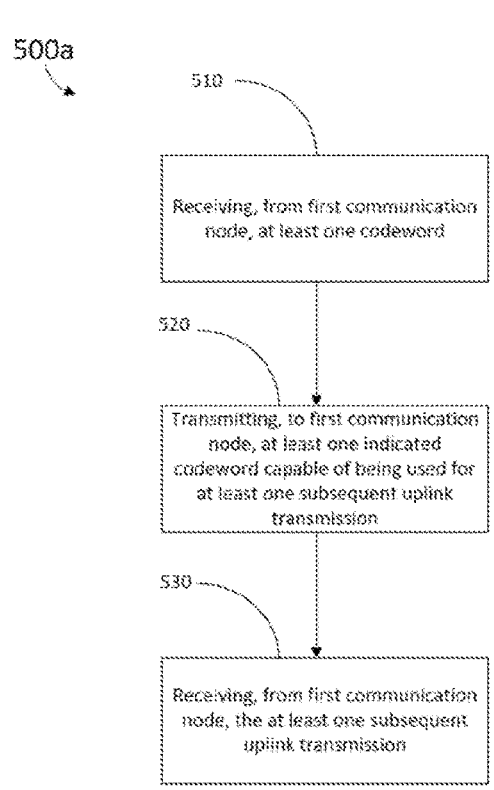
FIG. 5A is a schematic diagram illustrating a method for wireless communication, in accordance with some embodiments.

FIG. 5A is a schematic diagram illustrating a method 500a for wireless communication, in accordance with some embodiments. The method 500a is performed by the second communication node or network, which can include, or be implemented as, a gNB, an eNB, a core network, a TRP, an AP, etc., which corresponds to base station 102 from FIG. 1. At 510, the second communication node receives, from the first communication node, at least one codeword. At 520, the second communication node transmits, to the first communication node, at least one indicated codeword capable of being used for at least one subsequent UL transmission. At 530, the second communication node receives, from the first communication node, the at least one subsequent UL transmission.

Referring to block 510, the second communication node receives the at least one codeword from a first communication node according to the transmission mode of the first communication node. In an embodiment, the second communication device indicates a transmission mode to the first communication node by transmitting the transmission mode to the first communication node. In this embodiment, the transmission mode includes at least one of a first transmission mode (e.g., Mode 1 or fullpowerMode 1), a second transmission mode (e.g., Mode 2 or fullpowerMode 2), a full power transmission mode (e.g., Mode 0 or fullpower), or a transmission mode supporting indicating whether transmitted codeword is a full power state.

Referring again to block 510, the at least one codeword may be received in the form of at least one precoding matrix group corresponding to the at least one TPMI group or at least one corresponding TPMI group from the first communication node in order to configure or indicate the codeword that may be utilized for the subsequent codebook based uplink transmission of the first communication node.

In some embodiments, the second communication node receives information from the first communication node regarding a number of antenna ports, a coherence capability of the antenna ports, and a full power transmission mode for the UL transmission(s), which is related to the at least one codeword. The at least one codeword includes at least one precoding matrix group or at least one TPMI group that corresponds to a precoding matrix group.

In an embodiment, when the received information of the number of antenna ports for UL transmission of the first communication node is 4, the coherence capability of the antenna ports of the first communication node is non-coherent, and the transmission mode of the first communication note is Mode 2, the at least one codeword received from the first communication node is one of the precoding matrix groups and/or TPMI groups G0-G11, as shown in FIGS. 3A and 3B.

In another embodiment, when the received information of the number of antenna ports for UL transmission of the first communication node is 4, the coherence capability of the antenna ports of the first communication node is non-coherent, and the transmission mode of the first communication node is Mode 2, the at least one codeword received from the first communication node may include at least one of the precoding matrix groups and/or TPMI groups G0-G5, as shown in FIG. 3A.

In another embodiment, when the received information of the number of antenna ports for UL transmission of the first communication node is 4, the coherence capability of antenna ports of the first communication node is partial-coherent, and the transmission mode of the first communication node is Mode 2, the at least one codeword received from the first communication node is one of the precoding matrix groups and/or TPMI groups G0-G11, as shown in FIGS. 4A and 4B.

In another embodiment, when the received information of the number of antenna ports for UL transmission of the first communication node is 4, the coherence capability of antenna ports of the first communication node is partial-coherent, and the transmission mode of the first communication node is Mode 2, the at least one codeword received from the first communication node may include at least one of the precoding matrix groups and/or TPMI groups G0-G5, as shown in FIG. 4A.

In an embodiment, an indication information field of the reported at least one codeword reported by the first communication node can be a codepoint or a bitmap.

Referring to block 520 of FIG. 5, in some embodiments, the indicated codeword also refers to a configured codeword. In an embodiment, when the transmission mode configured or indicated by the second transmission node is Mode 2 or fullpowerMode 2, and the configured or indicated codeword is one of the codeword(s) received from the first communication node in block 510, the power scale for the configured or indicated codeword is 1.

Figure 5B:
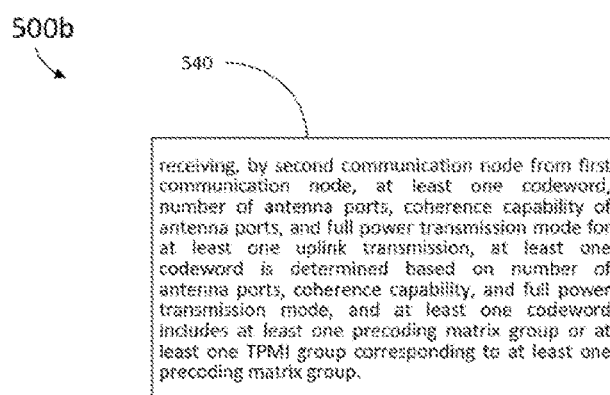
FIG. 5B is a schematic diagram illustrating a method for wireless communication, in accordance with some embodiments.

FIG. 5B is a schematic diagram illustrating a method for wireless communication, in accordance with some embodiments. The method 500b is performed by the second communication node or network, which can include, or be implemented as, a gNB, an eNB, a core network, a TRP, an AP, etc., which corresponds to base station 102 from FIG. 1. At 540, the second communication node receives, from the first communication node, at least one codeword, a number of antenna ports, a coherence capability of the antenna ports, and a full power transmission mode for the at least one uplink transmission. The at least one codeword is determined based on the number of antenna ports, the coherence capability, and the full power transmission mode. The at least one codeword includes at least one precoding matrix group or at least one Transmission Precoding Matrix Index (TPMI) group corresponding to the at least one precoding matrix group.

FIG. 6 is a table showing precoding matrices W for one-layer transmissions using four antenna ports with transform precoding disabled, in accordance with some embodiments. FIG. 6 is copied from the 5G technical specification 3GPP TS 38.211 V16.1.0, subclause 6.3.1.5, table 6.3.1.5-3.

FIG. 7 is a table showing precoding matrices W for two-later transmissions using four antenna ports with transform precoding disabled, in accordance with some embodiments. FIG. 7 is copied from the 5G technical specification 3GPP TS 38.211 V16.1.0, subclause 6.3.1.5, table 6.3.1.5-3.

FIG. 8 is a table showing precoding matrices W for three-layer transmissions using four antenna ports with transform precoding disabled, in accordance with some embodiments. FIG. 8 is copied from the 5G technical specification 3GPP TS 38.211 V16.1.0, subclause 6.3.1.5, table 6.3.1.5-5.

FIG. 9A illustrates a block diagram of an example base station 902, in accordance with some embodiments of the present disclosure. FIG. 9B illustrates a block diagram of an example UE 901, in accordance with some embodiments of the present disclosure. Referring to FIGS. 1-9B, the UE 901 (e.g., a wireless communication device, a terminal, a mobile device, a mobile user, and so on) is an example implementation of the UEs described herein, and the base station 902 is an example implementation of the base station(s) described herein.

The base station 902 and the UE 901 can include components and elements configured to support known or conventional operating features that need not be described in detail herein. In one illustrative embodiment, the base station 902 and the UE 901 can be used to communicate (e.g., transmit and receive) data symbols in a wireless communication environment, as described above. For instance, the base station 902 can be a base station (e.g., gNB, eNB, and so on), a server, a node, or any suitable computing device used to implement various network functions.

The base station 902 includes a transceiver module 910, an antenna 912, a processor module 914, a memory module 916, and a network communication module 918. The module 910, 912, 914, 916, and 918 are operatively coupled to and interconnected with one another via a data communication bus 920. The UE 901 includes a UE transceiver module 930, a UE antenna 932, a UE memory module 934, and a UE processor module 936. The modules 930, 932, 934, and 936 are operatively coupled to and interconnected with one another via a data communication bus 940. The base station 902 communicates with the UE 901 or another base station via a communication channel, which can be any wireless channel or other medium suitable for transmission of data as described herein.

As would be understood by persons of ordinary skill in the art, the base station 902 and the UE 901 can further include any number of modules other than the modules shown in FIGS. 9A and 9B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and blocks are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 930 includes a radio frequency (RF) transmitter and a RF receiver each including circuitry that is coupled to the antenna 932. A duplex switch (not shown) may alternatively couple the RF transmitter or receiver to the antenna in time duplex fashion. Similarly, in accordance with some embodiments, the transceiver 910 includes an RF transmitter and a RF receiver each having circuitry that is coupled to the antenna 912 or the antenna of another base station. A duplex switch may alternatively couple the RF transmitter or receiver to the antenna 912 in time duplex fashion. The operations of the two transceiver modules 910 and 930 can be coordinated in time such that the receiver circuitry is coupled to the antenna 932 for reception of transmissions over a wireless transmission link at the same time that the transmitter is coupled to the antenna 912. In some embodiments, there is close time synchronization with a minimal guard time between changes in duplex direction.

The UE transceiver 930 and the transceiver 910 are configured to communicate via the wireless data communication link, and cooperate with a suitably configured RF antenna arrangement 912/932 that can support a particular wireless communication protocol and modulation scheme. In some illustrative embodiments, the UE transceiver 910 and the transceiver 910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 930 and the base station transceiver 910 may be configured to support alternate, or additional, wireless data communication protocols, including future standards or variations thereof.

The transceiver 910 and the transceiver of another base station (such as but not limited to, the transceiver 910) are configured to communicate via a wireless data communication link, and cooperate with a suitably configured RF antenna arrangement that can support a particular wireless communication protocol and modulation scheme. In some illustrative embodiments, the transceiver 910 and the transceiver of another base station are configured to support industry standards such as the LTE and emerging 5G standards, and the like. It is understood, however, that the present disclosure is not necessarily limited in application to a particular standard and associated protocols. Rather, the transceiver 910 and the transceiver of another base station may be configured to support alternate, or additional, wireless data communication protocols, including future standards or variations thereof.

In accordance with various embodiments, the base station 902 may be a base station such as but not limited to, an eNB, a serving eNB, a target eNB, a femto station, or a pico station, for example. The base station 902 can be an RN, a regular, a DeNB, or a gNB. In some embodiments, the UE 901 may be embodied in various types of user devices such as a mobile phone, a smart phone, a personal digital assistant (PDA), tablet, laptop computer, wearable computing device, etc. The processor modules 914 and 936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 914 and 936, respectively, or in any practical combination thereof. The memory modules 916 and 934 may be realized as RAM memory, flash memory, ROM memory, EPROM memory, EEPROM memory, registers, a hard disk, a removable disk, a CD-ROM, or any other form of storage medium known in the art. In this regard, memory modules 916 and 934 may be coupled to the processor modules 914 and 936, respectively, such that the processors modules 914 and 936 can read information from, and write information to, memory modules 916 and 934, respectively. The memory modules 916 and 934 may also be integrated into their respective processor modules 914 and 936. In some embodiments, the memory modules 916 and 934 may each include a cache memory for storing temporary variables or other intermediate information during execution of instructions to be executed by processor modules 914 and 936, respectively. Memory modules 916 and 934 may also each include non-volatile memory for storing instructions to be executed by the processor modules 914 and 936, respectively.

The network communication module 918 generally represents the hardware, software, firmware, processing logic, and/or other components of the base station 902 that enable bi-directional communication between the transceiver 910 and other network components and communication nodes in communication with the base station 902. For example, the network communication module 918 may be configured to support internet or WiMAX traffic. In a deployment, without limitation, the network communication module 918 provides an 802.3 Ethernet interface such that the transceiver 910 can communicate with a conventional Ethernet based computer network. In this manner, the network communication module 918 may include a physical interface for connection to the computer network (e.g., Mobile Switching Center (MSC)). In some embodiments, the network communication module 918 includes a fiber transport connection configured to connect the base station 902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and blocks have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the blocks of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method, comprising:
reporting, by a first communication node to a second communication node, at least one codeword, a number of antenna ports, a coherence capability of the antenna ports, and a full power transmission mode for the at least one uplink transmission, wherein
the at least one codeword is determined based on the number of antenna ports, the coherence capability, and the full power transmission mode; and
the at least one codeword comprises at least one precoding matrix group or at least one Transmission Precoding Matrix Index (TPMI) group corresponding to the at least one precoding matrix group.

2. The method of claim 1, wherein
the number of the antenna ports is 4;
the coherence capability is non-coherent;
the full power transmission mode comprises mode 2; and
the at least one TPMI group is a TPMI group corresponding to one of index G0, G1, G2, G3, G4, G5, G6, G7, G8, G9, G10, or G11:

| Index | TPMI(s) |
|---|---|
| G0 | 1 layer: TPMI = 0 |
| G1 | 1 layer: TPMI = 0, TPMI = 2 |
|  | 2 layers: TPMI = 1 |
| G2 | 1 layer: TPMI = 0, TPMI = 1, TPMI = 2 |
|  | 2 layers: TPMI = 1, TPMI = 0, TPMI = 3 |
|  | 3 layers: TPMI = 0 |
| G3 | 2 layers: TPMI = 1 |
| G4 | 2 layers: TPMI = 1, TPMI = 0, TPMI = 3 |
|  | 3 layers: TPMI = 0 |
| G5 | 2 layers: TPMI = 1, TPMI = 4, TPMI = 0, TPMI = 2, TPMI = 3, TPMI = 5 |
|  | 3 layers: TPMI = 0 |
| G6 | 1 layer: TPMI = 0 |
|  | 2 layers: TPMI = 1 |
| G7 | 1 layer: TPMI = 0 |
| G8 | 1 layer: TPMI = 0, TPMI = 2 |
|  | 2 layers: TPMI = 1, TPMI = 0, TPMI = 3 |
|  | 3 layers: TPMI = 0 |
| G9 | 1 layer: TPMI = 0 |
|  | 2 layers: TPMI = 1, TPMI = 4, TPMI = 0, TPMI = 2, TPMI = 3, TPMI = 5 |
|  | 3 layers: TPMI = 0 |
| G10 | 1 layer: TPMI = 0, TPMI = 2 |
|  | 2 layers: TPMI = 1, TPMI = 4, TPMI = 0, TPMI = 2, TPMI = 3, TPMI = 5 |
|  | 3 layers: TPMI = 0 |
| G11 | 1 layer: TPMI = 0, TPMI = 1, TPMI = 2 |
|  | 2 layers: TPMI = 1, TPMI = 4, TPMI = 0, TPMI = 2, TPMI = 3, TPMI = 5 |
|  | 3 layers: TPMI = 0. |

3. The method of claim 1, wherein
the number of the antenna ports is 4;
the coherence capability is non-coherent;
the full power transmission mode comprises mode 2; and
the at least one precoding matrix group is a precoding matrix group corresponding to one of index G0, G1, G2, G3, G4, G5, G6, G7, G8, G9, G10, or G11:

| Index | Precoding Matrices |
|---|---|
| G0 | $\frac{1}{2}\begin{bmatrix}1\\0\\0\\0\end{bmatrix}$ |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}1&0\\0&0\\0&1\\0&0\end{bmatrix}$ |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}$, $\frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}$ |
| G4 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&01\end{bmatrix}\right\}, \frac{1}{2}\begin{bmatrix}1&0&0\\0&1&0\\0&0&1\\0&0&0\end{bmatrix}$ |
| G5 | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\1&0\\1&0\\0&1\end{bmatrix}\right\}$, $\frac{1}{2}\begin{bmatrix}1&0&0\\0&1&0\\0&0&1\\0&0&0\end{bmatrix}$ |

| Index | Precoding Matrices |
|---|---|
| G6 | $\left\{ \dfrac{1}{2}\begin{bmatrix}1\\0\\0\\0\end{bmatrix}, \dfrac{1}{2}\begin{bmatrix}1&0\\0&0\\0&1\\0&0\end{bmatrix} \right\}$ |
| G7 | $\left\{ \dfrac{1}{2}\begin{bmatrix}1\\0\\0\\0\end{bmatrix}, \left\{\dfrac{1}{2}\begin{bmatrix}1&0\\0&1\\0&0\\0&0\end{bmatrix}, \dfrac{1}{2}\begin{bmatrix}1&0\\0&0\\0&1\\0&0\end{bmatrix}, \dfrac{1}{2}\begin{bmatrix}0&0\\1&0\\0&1\\0&0\end{bmatrix}\right\}, \dfrac{1}{2}\begin{bmatrix}1&0&0\\0&1&0\\0&0&1\\0&0&0\end{bmatrix} \right\}$ |
| G8 | $\left\{ \left\{\dfrac{1}{2}\begin{bmatrix}1\\0\\0\\0\end{bmatrix}, \dfrac{1}{2}\begin{bmatrix}0\\0\\1\\0\end{bmatrix}\right\}, \left\{\dfrac{1}{2}\begin{bmatrix}1&0\\0&1\\0&0\\0&0\end{bmatrix}, \dfrac{1}{2}\begin{bmatrix}1&0\\0&0\\0&1\\0&0\end{bmatrix}, \dfrac{1}{2}\begin{bmatrix}0&0\\1&0\\0&1\\0&0\end{bmatrix}\right\}, \dfrac{1}{2}\begin{bmatrix}1&0&0\\0&1&0\\0&0&1\\0&0&0\end{bmatrix} \right\}$ |
| G9 | $\dfrac{1}{2}\begin{bmatrix}1\\0\\0\\0\end{bmatrix}$ |
| | $\left\{ \dfrac{1}{2}\begin{bmatrix}1&0\\0&0\\0&1\\0&0\end{bmatrix}, \dfrac{1}{2}\begin{bmatrix}0&0\\1&0\\0&0\\0&1\end{bmatrix}, \dfrac{1}{2}\begin{bmatrix}1&0\\0&1\\0&0\\0&0\end{bmatrix}, \dfrac{1}{2}\begin{bmatrix}1&0\\0&0\\0&0\\0&1\end{bmatrix}, \dfrac{1}{2}\begin{bmatrix}0&0\\1&0\\0&1\\0&0\end{bmatrix}, \dfrac{1}{2}\begin{bmatrix}0&0\\0&0\\1&0\\0&1\end{bmatrix} \right\},$ |
| | $\dfrac{1}{2}\begin{bmatrix}1&0&0\\0&1&0\\0&0&1\\0&0&0\end{bmatrix}$ |
| G10 | $\left\{ \dfrac{1}{2}\begin{bmatrix}1\\0\\0\\0\end{bmatrix}, \dfrac{1}{2}\begin{bmatrix}0\\0\\1\\0\end{bmatrix} \right\},$ |
| | $\left\{ \dfrac{1}{2}\begin{bmatrix}1&0\\0&0\\0&1\\0&0\end{bmatrix}, \dfrac{1}{2}\begin{bmatrix}0&0\\1&0\\0&0\\0&1\end{bmatrix}, \dfrac{1}{2}\begin{bmatrix}1&0\\0&1\\0&0\\0&0\end{bmatrix}, \dfrac{1}{2}\begin{bmatrix}1&0\\0&0\\0&0\\0&1\end{bmatrix}, \dfrac{1}{2}\begin{bmatrix}0&0\\1&0\\0&1\\0&0\end{bmatrix}, \dfrac{1}{2}\begin{bmatrix}0&0\\0&0\\1&0\\0&1\end{bmatrix} \right\},$ |
| | $\dfrac{1}{2}\begin{bmatrix}1&0&0\\0&1&0\\0&0&1\\0&0&0\end{bmatrix}$ |
| G11 | $\left\{ \dfrac{1}{2}\begin{bmatrix}1\\0\\0\\0\end{bmatrix}, \dfrac{1}{2}\begin{bmatrix}0\\0\\1\\0\end{bmatrix}, \dfrac{1}{2}\begin{bmatrix}0\\0\\0\\1\end{bmatrix} \right\},$ |
| | $\left\{ \dfrac{1}{2}\begin{bmatrix}1&0\\0&0\\0&1\\0&0\end{bmatrix}, \dfrac{1}{2}\begin{bmatrix}0&0\\1&0\\0&0\\0&1\end{bmatrix}, \dfrac{1}{2}\begin{bmatrix}1&0\\0&1\\0&0\\0&0\end{bmatrix}, \dfrac{1}{2}\begin{bmatrix}1&0\\0&0\\0&0\\0&1\end{bmatrix}, \dfrac{1}{2}\begin{bmatrix}0&0\\1&0\\0&1\\0&0\end{bmatrix}, \dfrac{1}{2}\begin{bmatrix}0&0\\0&0\\1&0\\0&1\end{bmatrix} \right\},$ |
| | $\dfrac{1}{2}\begin{bmatrix}1&0&0\\0&1&0\\0&0&1\\0&0&0\end{bmatrix}.$ |

4. The method of claim 1, wherein
the number of the antenna ports is 4;
the coherence capability is non-coherent;
the full power transmission mode comprises mode 2; and
the at least one TPMI group comprises at least one TPMI group corresponding to at least one of index G0, G1, G2, G3, G4, or G5:

| Index | TPMI(s) |
|---|---|
| G0 | 1 layer: TPMI = 0 |
| G1 | 1 layer: TPMI = 0, TPMI = 2 |
| | 2 layers: TPMI = 1 |
| G2 | 1 layer: TPMI = 0, TPMI = 1, TPMI = 2 |
| | 2 layers: TPMI = 1, TPMI = 0, TPMI = 3 |
| | 3 layers: TPMI = 0 |
| G3 | 2 layers: TPMI = 1 |
| G4 | 2 layers: TPMI = 1, TPMI = 0, TPMI = 3 |
| | 3 layers: TPMI = 0 |
| G5 | 2 layers: TPMI = 1, TPMI = 4, TPMI = 0, TPMI = 2, TPMI = 3, TPMI = 5 |
| | 3 layers: TPMI = 0. |

5. The method of claim 1, wherein
the number of the antenna ports is 4;
the coherence capability is non-coherent;
the full power transmission mode comprises mode 2; and
the at least one precoding matrix group comprises at least one precoding matrix group corresponding to at least one of index G0, G1, G2, G3, G4, or G5:

| Index | Precoding Matrices |
|---|---|
| G0 | $\dfrac{1}{2}\begin{bmatrix}1\\0\\0\\0\end{bmatrix}$ |
| G1 | $\left\{ \dfrac{1}{2}\begin{bmatrix}1\\0\\0\\0\end{bmatrix}, \dfrac{1}{2}\begin{bmatrix}0\\0\\1\\0\end{bmatrix} \right\}, \dfrac{1}{2}\begin{bmatrix}1&0\\0&0\\0&1\\0&0\end{bmatrix}$ |
| G2 | $\left\{ \dfrac{1}{2}\begin{bmatrix}1\\0\\0\\0\end{bmatrix}, \dfrac{1}{2}\begin{bmatrix}0\\1\\0\\0\end{bmatrix}, \dfrac{1}{2}\begin{bmatrix}0\\0\\1\\0\end{bmatrix} \right\}, \left\{ \dfrac{1}{2}\begin{bmatrix}1&0\\0&0\\0&1\\0&0\end{bmatrix}, \dfrac{1}{2}\begin{bmatrix}1&0\\0&1\\0&0\\0&0\end{bmatrix}, \dfrac{1}{2}\begin{bmatrix}0&0\\1&0\\0&1\\0&0\end{bmatrix} \right\},$ |
| | $\dfrac{1}{2}\begin{bmatrix}1&0&0\\0&1&0\\0&0&1\\0&0&0\end{bmatrix}$ |
| G3 | $\dfrac{1}{2}\begin{bmatrix}1&0\\0&0\\0&1\\0&0\end{bmatrix}$ |
| G4 | $\left\{ \dfrac{1}{2}\begin{bmatrix}1&0\\0&0\\0&1\\0&0\end{bmatrix}, \dfrac{1}{2}\begin{bmatrix}1&0\\0&1\\0&0\\0&0\end{bmatrix}, \dfrac{1}{2}\begin{bmatrix}0&0\\1&0\\0&1\\0&0\end{bmatrix} \right\}, \dfrac{1}{2}\begin{bmatrix}1&0&0\\0&1&0\\0&0&1\\0&0&0\end{bmatrix}$ |
| G5 | $\left\{ \dfrac{1}{2}\begin{bmatrix}1&0\\0&0\\0&1\\0&0\end{bmatrix}, \dfrac{1}{2}\begin{bmatrix}0&0\\1&0\\0&0\\0&1\end{bmatrix}, \dfrac{1}{2}\begin{bmatrix}1&0\\0&1\\0&0\\0&0\end{bmatrix}, \dfrac{1}{2}\begin{bmatrix}1&0\\0&0\\0&0\\0&1\end{bmatrix}, \dfrac{1}{2}\begin{bmatrix}0&0\\1&0\\0&1\\0&0\end{bmatrix}, \dfrac{1}{2}\begin{bmatrix}0&0\\0&0\\1&0\\0&1\end{bmatrix} \right\},$ |
| | $\dfrac{1}{2}\begin{bmatrix}1&0&0\\0&1&0\\0&0&1\\0&0&0\end{bmatrix}.$ |

6. The method of claim 1, wherein
the number of the antenna ports is 4;
the coherence capability is partial-coherent;
the full power transmission mode comprises mode 2; and the at least one TPMI group is a TPMI group corresponding to one of index G0, G1, G2, G3, G4, G5, G6, G7, G8, G9, G10, or G11:

| Index | TPMI(s) |
|---|---|
| G0 | 1 layer: TPMI = 0 |
| G1 | 1 layer: TPMI = 0, TPMI = 2, TPMI = 4, TPMI = 5, TPMI = 6, TPMI = 7<br>2 layers: TPMI = 1 |
| G2 | 1 layer: TPMI = 0, TPMI = 1, TPMI = 2, TPMI = 4, TPMI = 5, TPMI = 6, TPMI = 7<br>2 layers: TPMI = 1, TPMI = 0, TPMI = 3<br>3 layers: TPMI = 0 |
| G3 | 1 layer: TPMI = 4, TPMI = 5, TPMI = 6, TPMI = 7<br>2 layers: TPMI = 1 |
| G4 | 1 layer: TPMI = 4, TPMI = 5, TPMI = 6, TPMI = 7<br>2 layers: TPMI = 1, TPMI = 0, TPMI = 3;<br>3 layers: TPMI = 0; |
| G5 | 1 layer: TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0; |
| G6 | 1 layer: TPMI = 0, TPMI = 4, TPMI = 5, TPMI = 6, TPMI = 7<br>2 layers: TPMI = 1 |
| G7 | 1 layer: TPMI = 0, TPMI = 4, TPMI = 5, TPMI = 6, TPMI = 7<br>2 layers: TPMI = 1, TPMI = 0, TPMI = 3;<br>3 layers: TPMI = 0; |
| G8 | 1 layer: TPMI = 0, TPMI = 2, TPMI = 4, TPMI = 5, TPMI = 6, TPMI = 7<br>2 layers: TPMI = 1, TPMI = 0, TPMI = 3;<br>3 layers: TPMI = 0; |
| G9 | 1 layer: TPMI = 0, TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0; |
| G10 | 1 layer: TPMI = 0, TPMI = 2, TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0; |
| G11 | 1 layer: TPMI = 0, TPMI = 1, TPMI = 2, TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0. |

7. The method of claim 1, wherein
the number of the antenna ports is 4;
the coherence capability is partial-coherent;
the full power transmission mode comprises mode 2; and
the at least one precoding matrix group is a precoding matrix group corresponding to one of index G0, G1, G2, G3, G4, G5, G6, G7, G8, G9, G10, or G11:

| Index | Precoding Matrices |
|---|---|
| G0 | $\frac{1}{2}\begin{bmatrix}1\\0\\0\\0\end{bmatrix}$ |
| G1 | $\left\{\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}$ |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\},$ |
| | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G3 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}$ |
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ |
| | $\frac{1}{2}\begin{bmatrix}1&0&0\\0&1&0\\0&0&1\\0&0&0\end{bmatrix}$ |
| G6 | $\left\{\frac{1}{2}\begin{bmatrix}1\\0\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}$ |
| G7 | $\left\{\frac{1}{2}\begin{bmatrix}1\\0\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G8 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |

-continued

| Index | Precoding Matrices |
|---|---|
| | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G9 | $\left\{\frac{1}{2}\begin{bmatrix}1\\0\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ |
| | $\frac{1}{2}\begin{bmatrix}1&0&0\\0&1&0\\0&0&1\\0&0&0\end{bmatrix}$ |
| G10 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ |
| | $\frac{1}{2}\begin{bmatrix}1&0&0\\0&1&0\\0&0&1\\0&0&0\end{bmatrix}$ |
| G11 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ |
| | $\frac{1}{2}\begin{bmatrix}1&0&0\\0&1&0\\0&0&1\\0&0&0\end{bmatrix}.$ |

8. The method of claim 1, wherein
the number of the antenna ports is 4;
the coherence capability is partial-coherent;
the full power transmission mode comprises mode 2; and
the at least one TPMI group comprises at least one TPMI group corresponding to at least one of index G0, G1, G2, G3, G4, or G5:

| Index | TPMI(s) |
|---|---|
| G0 | 1 layer: TPMI = 0 |
| G1 | 1 layer: TPMI = 0, TPMI = 2, TPMI = 4, TPMI = 5, TPMI = 6, TPMI = 7 |
| | 2 layers: TPMI = 1 |
| G2 | 1 layer: TPMI = 0, TPMI = 1, TPMI = 2, TPMI = 4, TPMI = 5, TPMI = 6, TPMI = 7 |
| | 2 layers: TPMI = 1, TPMI = 0, TPMI = 3 |
| | 3 layers: TPMI = 0 |
| G3 | 1 layer: TPMI = 4, TPMI = 5, TPMI = 6, TPMI = 7 |
| | 2 layers: TPMI = 1 |
| G4 | 1 layer: TPMI = 4, TPMI = 5, TPMI = 6, TPMI = 7 |
| | 2 layers: TPMI = 1, TPMI = 0, TPMI = 3; |
| | 3 layers: TPMI = 0; |
| G5 | 1 layer: TPMI = 4, TPMI = 5, TPMI = 6, TPMI = 7, TPMI = 8, TPMI = 9, TPMI = 10, TPMI = 11 |
| | 2 layers: TPMI = 1, TPMI = 4, TPMI = 0, TPMI = 2, TPMI = 3, TPMI = 5; |
| | 3 layers: TPMI = 0. |

9. The method of claim 1, wherein
the number of the antenna ports is 4;
the coherence capability is partial-coherent;
the full power transmission mode comprises mode 2; and
the at least one precoding matrix group comprises at least one precoding matrix group corresponding to at least one of index G0, G1, G2, G3, G4, or G5:

| Index | Precoding Matrices |
|---|---|
| G0 | $\frac{1}{2}\begin{bmatrix}1\\0\\0\\0\end{bmatrix}$ |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}$ |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G3 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}$ |
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |
| | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |

-continued

| Index | Precoding Matrices |
|---|---|
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}$, $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}$, $\left\{\frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\0 & 0\\1 & 0\\0 & 1\end{bmatrix}\right\}$, $\frac{1}{2}\begin{bmatrix}1 & 0 & 0\\0 & 1 & 0\\0 & 0 & 1\\0 & 0 & 0\end{bmatrix}$. |

10. The method of claim 1, wherein an indication information field of the at least one codeword is a codepoint or a bitmap.

11. The method of claim 1, wherein a power scale of the at least one codeword is 1.

12. A first communication node comprising:
at least one processor configured to:
report, via a transmitter to a second communication node, at least one codeword, a number of antenna ports, a coherence capability of the antenna ports, and a full power transmission mode for the at least one uplink transmission, wherein
the at least one codeword is determined based on the number of antenna ports, the coherence capability, and the full power transmission mode; and
the at least one codeword comprises at least one precoding matrix group or at least one Transmission Precoding Matrix Index (TPMI) group corresponding to the at least one precoding matrix group.

13. The first communication node of claim 12, wherein
the number of the antenna ports is 4;
the coherence capability is non-coherent;
the full power transmission mode comprises mode 2; and
the at least one TPMI group is a TPMI group corresponding to one of index G0, G1, G2, G3, G4, G5, G6, G7, G8, G9, G10, or G11:

| Index | TPMI(s) |
|---|---|
| G0 | 1 layer: TPMI = 0 |
| G1 | 1 layer: TPMI = 0, TPMI = 2<br>2 layers: TPMI = 1 |
| G2 | 1 layer: TPMI = 0, TPMI = 1, TPMI = 2<br>2 layers: TPMI = 1, TPMI = 0, TPMI = 3<br>3 layers: TPMI = 0 |
| G3 | 2 layers: TPMI = 1 |
| G4 | 2 layers: TPMI = 1, TPMI = 0, TPMI = 3<br>3 layers: TPMI = 0 |
| G5 | 2 layers: TPMI = 1, TPMI = 4, TPMI = 0, TPMI = 2, TPMI = 3, TPMI = 5<br>3 layers: TPMI = 0 |
| G6 | 1 layer: TPMI = 0<br>2 layers: TPMI = 1 |
| G7 | 1 layer: TPMI = 0<br>2 layers: TPMI = 1, TPMI = 0, TPMI = 3<br>3 layers: TPMI = 0 |

-continued

| Index | TPMI(s) |
|---|---|
| G8 | 1 layer: TPMI = 0, TPMI = 2<br>2 layers: TPMI = 1, TPMI = 0, TPMI = 3<br>3 layers: TPMI = 0 |
| G9 | 1 layer: TPMI = 0<br>2 layers: TPMI = 1, TPMI = 4, TPMI = 0, TPMI = 2, TPMI = 3, TPMI = 5<br>3 layers: TPMI = 0 |
| G10 | 1 layer: TPMI = 0, TPMI = 2<br>2 layers: TPMI = 1, TPMI = 4, TPMI = 0, TPMI = 2, TPMI = 3, TPMI = 5<br>3 layers: TPMI = 0 |
| G11 | 1 layer: TPMI = 0, TPMI = 1, TPMI = 2<br>2 layers: TPMI = 1, TPMI = 4, TPMI = 0, TPMI = 2, TPMI = 3, TPMI = 5<br>3 layers: TPMI = 0. |

14. The first communication node of claim 12, wherein
the number of the antenna ports is 4;
the coherence capability is non-coherent;
the full power transmission mode comprises mode 2; and
the at least one precoding matrix group is a precoding matrix group corresponding to one of index G0, G1, G2, G3, G4, G5, G6, G7, G8, G9, G10, or G11:

| Index | Precoding Matrices |
|---|---|
| G0 | $\frac{1}{2}\begin{bmatrix}1\\0\\0\\0\end{bmatrix}$ |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}1 & 0\\0 & 0\\0 & 1\\0 & 0\end{bmatrix}$ |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}0 & 0\\1 & 0\\0 & 1\\0 & 0\end{bmatrix}\right\}$, $\frac{1}{2}\begin{bmatrix}1 & 0 & 0\\0 & 1 & 0\\0 & 0 & 1\\0 & 0 & 0\end{bmatrix}$ |
| G3 | $\frac{1}{2}\begin{bmatrix}1 & 0\\0 & 0\\0 & 1\\0 & 0\end{bmatrix}$ |
| G4 | $\left\{\frac{1}{2}\begin{bmatrix}1 & 0\\0 & 0\\0 & 1\\0 & 0\end{bmatrix}, \frac{1}{2}\begin{bmatrix}1 & 0\\0 & 1\\0 & 0\\0 & 0\end{bmatrix}, \frac{1}{2}\begin{bmatrix}0 & 0\\1 & 0\\0 & 1\\0 & 0\end{bmatrix}\right\}, \frac{1}{2}\begin{bmatrix}1 & 0 & 0\\0 & 1 & 0\\0 & 0 & 1\\0 & 0 & 0\end{bmatrix}$ |
| G5 | $\left\{\frac{1}{2}\begin{bmatrix}1 & 0\\0 & 0\\0 & 1\\0 & 0\end{bmatrix}, \frac{1}{2}\begin{bmatrix}0 & 0\\1 & 0\\0 & 0\\0 & 1\end{bmatrix}, \frac{1}{2}\begin{bmatrix}1 & 0\\0 & 1\\0 & 0\\0 & 0\end{bmatrix}, \frac{1}{2}\begin{bmatrix}1 & 0\\0 & 0\\0 & 0\\0 & 1\end{bmatrix}, \frac{1}{2}\begin{bmatrix}0 & 0\\1 & 0\\0 & 1\\0 & 0\end{bmatrix}, \frac{1}{2}\begin{bmatrix}0 & 0\\0 & 0\\1 & 0\\0 & 1\end{bmatrix}\right\}$, $\frac{1}{2}\begin{bmatrix}1 & 0 & 0\\0 & 1 & 0\\0 & 0 & 1\\0 & 0 & 0\end{bmatrix}$ |

-continued

| Index | Precoding Matrices |
|---|---|
| G6 | $\frac{1}{2}\begin{bmatrix}1\\0\\0\\0\end{bmatrix}, \frac{1}{2}\begin{bmatrix}1&0\\0&0\\0&1\\0&0\end{bmatrix}$ |
| G7 | $\frac{1}{2}\begin{bmatrix}1\\0\\0\\0\end{bmatrix}, \left\{\frac{1}{2}\begin{bmatrix}1&0\\0&1\\0&0\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G8 | $\left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G9 | $\frac{1}{2}\begin{bmatrix}1\\0\\0\\0\end{bmatrix},$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ $\frac{1}{2}\begin{bmatrix}1&0&0\\0&1&0\\0&0&1\\0&0&0\end{bmatrix}$ |
| G10 | $\left\{\frac{1}{2}\begin{bmatrix}1\\0\\0\\0\end{bmatrix}, \frac{1}{2}\begin{bmatrix}0\\1\\0\\0\end{bmatrix}\right\},$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ $\frac{1}{2}\begin{bmatrix}1&0&0\\0&1&0\\0&0&1\\0&0&0\end{bmatrix}$ |
| G11 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\},$ |
| G11 | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ $\frac{1}{2}\begin{bmatrix}1&0&0\\0&1&0\\0&0&1\\0&0&0\end{bmatrix}.$ |

15. The first communication node of claim 12, wherein the number of the antenna ports is 4; the coherence capability is non-coherent; the full power transmission mode comprises mode 2; and the at least one TPMI group comprises at least one TPMI group corresponding to at least one of index G0, G1, G2, G3, G4, or G5:

| Index | TPMI(s) |
|---|---|
| G0 | 1 layer: TPMI = 0 |
| G1 | 1 layer: TPMI = 0, TPMI = 2<br>2 layers: TPMI = 1 |
| G2 | 1 layer: TPMI = 0, TPMI = 1, TPMI = 2<br>2 layers: TPMI = 1, TPMI = 0, TPMI = 3<br>3 layers: TPMI = 0 |
| G3 | 2 layers: TPMI = 1 |
| G4 | 2 layers: TPMI = 1, TPMI = 0, TPMI = 3<br>3 layers: TPMI = 0 |
| G5 | 2 layers: TPMI = 1, TPMI = 4, TPMI = 0, TPMI = 2, TPMI = 3, TPMI = 5<br>3 layers: TPMI = 0. |

16. The first communication node of claim 12, wherein the number of the antenna ports is 4; the coherence capability is non-coherent; the full power transmission mode comprises mode 2; and the at least one precoding matrix group comprises at least one precoding matrix group corresponding to at least one of index G0, G1, G2, G3, G4, or G5:

| Index | Precoding Matrices |
|---|---|
| G0 | $\frac{1}{2}\begin{bmatrix}1\\0\\0\\0\end{bmatrix}$ |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}1&0\\0&0\\0&1\\0&0\end{bmatrix}$ |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\},$ |
| G2 | $\frac{1}{2}\begin{bmatrix}1&0&0\\0&1&0\\0&0&1\\0&0&0\end{bmatrix}$ |
| G3 | $\frac{1}{2}\begin{bmatrix}1&0\\0&0\\0&1\\0&0\end{bmatrix}$ |
| G4 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}$ |
| G4 | $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ $\frac{1}{2}\begin{bmatrix}1&0&0\\0&1&0\\0&0&1\\0&0&0\end{bmatrix}.$ |

17. The first communication node of claim 12, wherein the number of the antenna ports is 4; the coherence capability is partial-coherent; the full power transmission mode comprises mode 2; and the at least one TPMI group is a TPMI group corresponding to one of index G0, G1, G2, G3, G4, G5, G6, G7, G8, G9, G10, or G11:

| Index | TPMI(s) |
|---|---|
| G0 | 1 layer: TPMI = 0 |
| G1 | 1 layer: TPMI = 0, TPMI = 2, TPMI = 4, TPMI = 5, TPMI = 6, TPMI = 7<br>2 layers: TPMI = 1 |
| G2 | 1 layer: TPMI = 0, TPMI = 1, TPMI = 2, TPMI = 4, TPMI = 5, TPMI = 6, TPMI = 7<br>2 layers: TPMI = 1, TPMI = 0, TPMI = 3<br>3 layers: TPMI = 0 |
| G3 | 1 layer: TPMI = 4, TPMI = 5, TPMI = 6, TPMI = 7<br>2 layers: TPMI = 1 |
| G4 | 1 layer: TPMI = 4, TPMI = 5, TPMI = 6, TPMI = 7<br>2 layers: TPMI = 1, TPMI = 0, TPMI = 3;<br>3 layers: TPMI = 0; |
| G5 | 1 layer: TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0; |
| G6 | 1 layer: TPMI = 0, TPMI = 4, TPMI = 5, TPMI = 6, TPMI = 7<br>2 layers: TPMI = 1 |
| G7 | 1 layer: TPMI = 0, TPMI = 4, TPMI = 5, TPMI = 6, TPMI = 7<br>2 layers: TPMI = 1, TPMI = 0, TPMI = 3;<br>3 layers: TPMI = 0; |
| G8 | 1 layer: TPMI = 0, TPMI = 2, TPMI = 4, TPMI = 5, TPMI = 6, TPMI = 7<br>2 layers: TPMI = 1, TPMI = 0, TPMI = 3;<br>3 layers: TPMI = 0; |
| G9 | 1 layer: TPMI = 0, TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0; |
| G10 | 1 layer: TPMI = 0, TPMI = 2, TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0; |
| G11 | 1 layer: TPMI = 0, TPMI = 1, TPMI = 2, TPMI = 4, TPMI = 5, TPMI = 6, TPMI = 7, TPMI = 8, TPMI = 9, TPMI = 10, TPMI = 11<br>2 layers: TPMI = 1, TPMI = 4, TPMI = 0, TPMI = 2, TPMI = 3, TPMI = 5;<br>3 layers: TPMI = 0. |

18. The first communication node of claim 12, wherein the number of the antenna ports is 4;
the coherence capability is partial-coherent;
the full power transmission mode comprises mode 2; and
the at least one precoding matrix group is a precoding matrix group corresponding to one of index G0, G1, G2, G3, G4, G5, G6, G7, G8, G9, G10, or G11:

| Index | Precoding Matrices |
|---|---|
| G0 | $\frac{1}{2}\begin{bmatrix}1\\0\\0\\0\end{bmatrix}$ |
| G1 | $\left\{ \frac{1}{2}\begin{bmatrix}1\\0\\0\\0\end{bmatrix}, \frac{1}{2}\begin{bmatrix}0\\0\\1\\0\end{bmatrix} \right\}, \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\}$ |
| G2 | $\left\{ \frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix} \right\},$ |
| | $\left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$ |
| | $\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix}$ |
| G3 | $\left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\}, \frac{1}{2}\begin{bmatrix}1&0\\0&0\\0&1\\0&0\end{bmatrix}$ |
| G4 | $\left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$ |
| | $\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix}$ |
| G5 | $\left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$ |
| | $\left\{ \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix} \right\},$ |
| | $\left\{ \frac{1}{2}\begin{bmatrix}1&0\\0&0\\0&1\\0&0\end{bmatrix}, \frac{1}{2}\begin{bmatrix}0&0\\1&0\\0&1\\0&0\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&0\\0&1\end{bmatrix}, \frac{1}{2}\begin{bmatrix}0&0\\0&0\\1&0\\0&1\end{bmatrix} \right\},$ |
| G6 | $\frac{1}{2}\begin{bmatrix}1\\0\\0\\0\end{bmatrix}, \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\}, \frac{1}{2}\begin{bmatrix}1&0\\0&0\\0&1\\0&0\end{bmatrix}$ |
| G7 | $\frac{1}{2}\begin{bmatrix}1\\0\\0\\0\end{bmatrix}, \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$ |
| | $\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix}$ |
| G8 | $\left\{ \frac{1}{2}\begin{bmatrix}1\\0\\0\\0\end{bmatrix}, \frac{1}{2}\begin{bmatrix}0\\0\\1\\0\end{bmatrix} \right\}, \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$ |
| | $\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix}$ |

| Index | Precoding Matrices |
|---|---|
| G9 | $\frac{1}{2}\begin{bmatrix}1\\0\\0\\0\end{bmatrix}, \left\{\frac{1}{2}\begin{bmatrix}1\\1\\0\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ $\left\{\frac{1}{2}\begin{bmatrix}0\\1\\1\\1\end{bmatrix}, \frac{1}{2}\begin{bmatrix}0\\1\\1\\0\end{bmatrix}, \frac{1}{2}\begin{bmatrix}0\\1\\1\\0\end{bmatrix}, \frac{1}{2}\begin{bmatrix}0\\1\\1\\0\end{bmatrix}\right\},$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ $\frac{1}{2}\begin{bmatrix}1&0&0\\0&1&0\\0&0&1\\0&0&0\end{bmatrix}$ |
| G10 | $\left\{\frac{1}{2}\begin{bmatrix}1\\1\\0\\0\end{bmatrix}, \frac{1}{2}\begin{bmatrix}0\\0\\1\\1\end{bmatrix}\right\}, \left\{\frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ $\frac{1}{2}\begin{bmatrix}1&0&0\\0&1&0\\0&0&1\\0&0&0\end{bmatrix}$ |
| G11 | $\left\{\frac{1}{2}\begin{bmatrix}1\\1\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$ |

| Index | Precoding Matrices |
|---|---|
| | $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$ $\frac{1}{2}\begin{bmatrix}1&0&0\\0&1&0\\0&0&1\\0&0&0\end{bmatrix}.$ |

19. The first communication node of claim 12, wherein the number of the antenna ports is 4; the coherence capability is partial-coherent; the full power transmission mode comprises mode 2; and the at least one TPMI group comprises at least one TPMI group corresponding to at least one of index G0, G1, G2, G3, G4, or G5:

| Index | TPMI(s) |
|---|---|
| G0 | 1 layer: TPMI = 0 |
| G1 | 1 layer: TPMI = 0, TPMI = 2, TPMI = 4, TPMI = 5, TPMI = 6, TPMI = 7 |
| | 2 layers: TPMI = 1 |
| G2 | 1 layer: TPMI = 0, TPMI = 1, TPMI = 2, TPMI = 4, TPMI = 5, TPMI = 6, TPMI = 7 |
| | 2 layers: TPMI = 1, TPMI = 0, TPMI = 3 |
| | 3 layers: TPMI = 0 |
| G3 | 1 layer: TPMI = 4, TPMI = 5, TPMI = 6, TPMI = 7 |
| | 2 layers: TPMI = 1 |
| G4 | 1 layer: TPMI = 4, TPMI = 5, TPMI = 6, TPMI = 7 |
| | 2 layers: TPMI = 1, TPMI = 0, TPMI = 3; |
| | 3 layers: TPMI = 0; |
| G5 | 1 layer: TPMI = 4, TPMI = 5, TPMI = 6, TPMI = 7, TPMI = 8, TPMI = 9, TPMI = 10, TPMI = 11 |
| | 2 layers: TPMI = 1, TPMI = 4, TPMI = 0, TPMI = 2, TPMI = 3, TPMI = 5; |
| | 3 layers: TPMI = 0. |

20. The first communication node of claim 12, wherein an indication information field of the at least one codeword is a codepoint or a bitmap.

* * * * *